(12) United States Patent
Cabodi et al.

(10) Patent No.: US 10,239,793 B2
(45) Date of Patent: Mar. 26, 2019

(54) MELTED PRODUCT WITH A HIGH ZIRCONIUM CONTENT

(71) Applicant: SAINT-GOBAIN CENTRE DE RECHERCHES ET D'ETUDES EUROPEEN, Courbevoie (FR)

(72) Inventors: Isabelle Cabodi, Cavaillon (FR); Michel Marc Gaubil, Les Angles (FR); Christel Morand, Plan d'Orgno (FR)

(73) Assignee: SAINT-GOBAIN CENTRE DE RECHERCHES ET D'ETUDES EUROPEAN, Courbevoie (FR)

( * ) Notice: Subject to any disclaimer, the term of this patent is extended or adjusted under 35 U.S.C. 154(b) by 0 days.

(21) Appl. No.: 15/552,015

(22) PCT Filed: Feb. 19, 2016

(86) PCT No.: PCT/EP2016/053528
§ 371 (c)(1),
(2) Date: Aug. 18, 2017

(87) PCT Pub. No.: WO2016/131948
PCT Pub. Date: Aug. 25, 2016

(65) Prior Publication Data
US 2018/0037509 A1 Feb. 8, 2018

(30) Foreign Application Priority Data
Feb. 20, 2015 (FR) ...................... 15 51485

(51) Int. Cl.
*C04B 35/484* (2006.01)
*C04B 35/657* (2006.01)

(52) U.S. Cl.
CPC .......... *C04B 35/484* (2013.01); *C04B 35/657* (2013.01); *C04B 2235/3201* (2013.01); *C04B 2235/3208* (2013.01); *C04B 2235/3213* (2013.01); *C04B 2235/3217* (2013.01); *C04B 2235/3218* (2013.01); *C04B 2235/3225* (2013.01); *C04B 2235/3232* (2013.01); *C04B 2235/3244* (2013.01); *C04B 2235/3272* (2013.01); *C04B 2235/3409* (2013.01); *C04B 2235/3418* (2013.01); *C04B 2235/447* (2013.01); *C04B 2235/6022* (2013.01); *C04B 2235/656* (2013.01); *C04B 2235/727* (2013.01); *C04B 2235/9607* (2013.01)

(58) Field of Classification Search
CPC ..................................................... C04B 35/484
See application file for complete search history.

(56) References Cited

U.S. PATENT DOCUMENTS

| | | | | |
|---|---|---|---|---|
| 9,475,735 B2 * | 10/2016 | Kuboki | ..................... | C03B 5/43 |
| 9,751,806 B2 * | 9/2017 | Sugiyama | ............. | C04B 35/484 |
| 2005/0159294 A1 * | 7/2005 | Boussant-Roux | ........ | C03B 5/43 |
| | | | | 501/104 |
| 2012/0295785 A1 | 11/2012 | Gaubil et al. | | |
| 2014/0196504 A1 | 7/2014 | Cabodi et al. | | |
| 2016/0023955 A1 * | 1/2016 | Kuboki | ..................... | C03B 5/43 |
| | | | | 501/104 |

FOREIGN PATENT DOCUMENTS

WO 2003074445 A1 9/2003

OTHER PUBLICATIONS

Corresponding International application, application No. PCT/EP2016/053528, International Search Report dated Mar. 22, 2016, 3 pages.
Database WPI, Week 200827, Thomson Scientific. London. GB; AN 2008-D74440, XP002749022.—& JP 2008 007358 A (Saint-Gobain TM KK), Jan. 17, 2008; Abstract.

* cited by examiner

*Primary Examiner* — Karl E Group
(74) *Attorney, Agent, or Firm* — Cooper Legal Group, LLC; Ronald M. Kachmarik

(57) ABSTRACT

A fused-cast refractory product including, as mass percentages on the basis of the oxides and for a total of 100% of the oxides: $ZrO_2+HfO_2$: remainder to 100%, with $HfO_2 \leq 5\%$; $SiO_2$: 1.5% to 7.5%; $Al_2O_3$: 1.0% to 3.0%; CaO+SrO: 1.2% to 3.0%; $Y_2O_3$: 1.5% to 3.0%; $Na_2O+K_2O$: <0.15%; $B_2O_3$: <1.0%; $P_2O_5$: <0.15%; $Fe_2O_3+TiO_2$: <0.55%; oxide species other than $ZrO_2$, $HfO_2$, $SiO_2$, $Al_2O_3$, $Na_2O$, $K_2O$, $B_2O_3$, CaO, SrO, $Y_2O_3$, $P_2O_5$, $Fe_2O_3$ and $TiO_2$: <1.5%.

15 Claims, No Drawings

MELTED PRODUCT WITH A HIGH ZIRCONIUM CONTENT

TECHNICAL FIELD

The invention relates to a novel fused-cast refractory product with a high content of zirconia.

PRIOR ART

Among refractory products, fused-cast products are distinguished, which products are well known for the construction of glass melting furnaces and sintered products.

Unlike sintered products, fused-cast products usually comprise an intergranular vitreous phase linking crystallized grains. The problems posed by sintered products and by fused-cast products, and the technical solutions adopted to solve them, are generally different. A composition developed for manufacturing a sintered product therefore cannot, in principle, be used as such for manufacturing a fused-cast product, and vice versa.

Fused-cast products, which are often known as electrocast products, are obtained by melting a mixture of suitable starting materials in an electric arc furnace or via any other technique suited to these products. The molten material is then cast in a mold and the product obtained then undergoes a controlled cooling cycle to be brought to room temperature without fracturing. This operation is known to those skilled in the art as annealing.

Among the fused-cast products, electrocast products with a high content of zirconia are renowned for their very high corrosion resistance without coloring the glass produced and without generating defects.

For the construction of glass melting furnaces, the company Saint-Gobain™ K.K has developed and marketed a product known as SCIMOS CZ, the chemical composition of which comprises about 94% zirconia, 4 to 5% silica, about 0.6% alumina and 0.4% boron oxide. The absence of alkaline oxides leads, however, to the formation of zircon at high temperature (1200-1600° C.) from the zirconia and silica present in the product.

Now, the formation of zircon is harmful since it is accompanied by a volume decrease of the order of 20%, thus creating mechanical stresses that cause cracks, especially during temperature changes associated with the placing on standby of the furnace or a change in the composition (and thus the melting point) of the glass. These changes constitute thermal cycles with a temperature passing alternately from a value below 1000-1150° C. to a value above this range.

To limit the formation of zircon, fused-cast products with a high content of zirconia conventionally comprise alkaline oxides, in particular sodium oxide ($Na_2O$). For example, the product ER-1195 manufactured and sold by the company Saint-Gobain SEFPRO and covered by patent EP-B-403 387 is nowadays widely used in glass melting furnaces. Its chemical composition comprises about 94% zirconia, 4% to 5% silica, about 1% alumina and 0.3% sodium oxide. It is typical of products with a high content of zirconia used for glass furnaces.

It has been seen, however, that the sodium oxide initially present in a refractory product used in contact with molten glass has a tendency to migrate in this glass, in particular when the glass does not contain alkalis. Consequently, zircon may be gradually formed, which reduces the lifetime of the product, especially in the case of thermal cycling.

There is a need for a refractory product with a high content of zirconia, which has, when it is in contact with molten glass and subjected to thermal cycling, a longer lifetime than that of the known products.

The present invention is directed toward satisfying this need.

SUMMARY OF THE INVENTION

More particularly, the invention relates to a fused-cast refractory product comprising, as mass percentages on the basis of the oxides and for a total of 100% of the oxides:
  $ZrO_2+HfO_2$: remainder to 100%, with $HfO_2 \leq 5\%$;
  $SiO_2$: 1.5% to 7.5%;
  $Al_2O_3$: 1.0% to 3.0%;
  $CaO+SrO$: 1.2% to 3.0%;
  $Y_2O_3$: 1.5% to 3.0%;
  $Na_2O+K_2O$: <0.15%;
  $B_2O_3$: <1.0%;
  $P_2O_5$: <0.15%;
  $Fe_2O_3+TiO_2$: <0.55%;
  species other than $ZrO_2$, $HfO_2$, $SiO_2$, $Al_2O_3$, $Na_2O$, $K_2O$, $B_2O_3$, $CaO$, $SrO$, $Y_2O_3$, $P_2O_5$, $Fe_2O_3$ and $TiO_2$, or "other oxide species": <1.5%.

As will be seen later, surprisingly, the inventors have discovered that this composition gives good resistance to thermal cycling. In addition, this composition comprises substantially no alkaline oxides, which avoids modification of the composition by migration of these oxides to the molten glass, and thus limits the degradation of the properties of the product. This results in a longer lifetime.

The product may in particular be in the form of a block with a mass of greater than 1 kg.

A refractory product according to the invention may then comprise one or more of the following optional characteristics:
  The mass content of zirconia is greater than or equal to 85.0%, or even greater than or equal to 86.0%, or even greater than or equal to 87.0%.
  The content of hafnium oxide $HfO_2$ is less than or equal to 5%, preferably less than or equal to 4%, preferably less than or equal to 3%, preferably less than or equal to 2%.
  The mass content of silica $SiO_2$ is less than or equal to 7.0%, less than or equal to 6.5%, or even less than or equal to 6.0%, or even less than or equal to 5.5%.
  The mass content of silica $SiO_2$ is greater than or equal to 2.0%, or even greater than or equal to 2.5%, or even greater than or equal to 3.0%.
  The mass content of alumina $Al_2O_3$ is less than or equal to 2.5%, or even less than or equal to 2.3%, or even less than or equal to 2.1%, or even less than or equal to 2.0%.
  The mass content of $Al_2O_3$ is greater than or equal to 1.1%, or even greater than or equal to 1.2%, or even greater than or equal to 1.3%, or even greater than or equal to 1.5%.
  The mass content of calcium oxide and/or strontium oxide $CaO+SrO$ is less than or equal to 2.8%, or even less than or equal to 2.6%, or even less than or equal to 2.5%.
  The mass content of calcium oxide and/or strontium oxide $CaO+SrO$ is greater than or equal to 1.3%, or even greater than or equal to 1.5%, or even greater than or equal to 1.8%, or even greater than or equal to 1.9%, or even greater than or equal to 2.0%, or even greater than or equal to 2.1%.

The mass content of calcium oxide CaO is less than or equal to 2.8%, or even less than or equal to 2.6%, or even less than or equal to 2.5%, or even less than or equal to 2.0%.

The mass content of calcium oxide CaO is greater than or equal to 1.0%, or even greater than or equal to 1.3%, or even greater than or equal to 1.5%, or even greater than or equal to 1.8%.

The mass content of strontium oxide SrO is less than or equal to 2.8%, or even less than or equal to 2.6%, or even less than or equal to 2.5%, or even less than or equal to 2.0%.

The mass content of strontium oxide SrO is greater than or equal to 1.0%, or even greater than or equal to 1.3%, or even greater than or equal to 1.5%, or even greater than or equal to 1.8%.

The ratio of the mass content of alumina and/or of calcium oxide and/or strontium oxide to the content of silica $(Al_2O_3+CaO+SrO)/SiO_2$ is greater than or equal to 0.70, or even greater than or equal to 0.75, or even greater than or equal to 0.80, or even greater than or equal to 0.85.

The mass content of yttrium oxide $Y_2O_3$ is less than or equal to 2.8%, or even less than 2.5%, or even less than 2.2%. or even less than 2.1%. or even less than 2.0%.

The mass content of yttrium oxide $Y_2O_3$ is greater than or equal to 1.6%, or even greater than 1.7%, or even greater than 1.8%.

The mass content of alkaline oxides $Na_2O+K_2O$ is less than or equal to 0.10%, or even less than or equal to 0.05%.

The mass content of $B_2O_3$ is less than or equal to 0.8%, or even less than or equal to 0.7%, or even less than or equal to 0.6%, or even less than or equal to 0.5%.

The ratio of the mass content of silica to the content of boron oxide $SiO_2/B_2O_3$ is greater than or equal to 8.

$B_2O_3$ is present only as impurities.

The mass content of $P_2O_5$ is preferably less than 0.10%, more preferably less than 0.05%.

The iron and/or titanium and/or barium and/or magnesium and/or zinc and/or phosphorus oxides are present only as impurities.

The mass content of iron oxide and/or titanium oxide, $Fe_2O_3+TiO_2$, is less than 0.4%, preferably less than 0.3%, preferably less than 0.2%.

The total mass content of the "other oxide species" is less than 1.0%, less than 0.6%, less than 0.5%, or even less than 0.3%.

The "other oxide species" are constituted only of impurities.

The mass content of $Ta_2O_5$ is less than or equal to 0.1%, preferably less than or equal to 0.05%.

The mass content of $Nb_2O_5$ is less than or equal to 0.1%, preferably less than or equal to 0.05%.

The mass content of $Ta_2O_5+Nb_2O_5$ is less than or equal to 0.1%, preferably less than or equal to 0.05%.

The invention also relates to a process for manufacturing a refractory product according to the invention, comprising the following successive steps:
a) mixing starting materials so as to form a starting feedstock,
b) melting said starting feedstock until a molten material is obtained,
c) casting, preferably in a mold, and solidifying said molten material, by cooling, so as to obtain a refractory product, this process being noteworthy in that said starting materials are chosen so that said refractory product is in accordance with the invention.

Preferably, the oxides for which a minimum content is required ($ZrO_2+HfO_2$, $SiO_2$, $Al_2O_3$, $Y_2O_3$, CaO+SrO) or precursors of these oxides are systematically and methodically added. Preferably, the contents of these oxides in the sources of the other oxides in which they are conventionally considered as impurities is taken into account.

Preferably, the cooling is controlled, preferably so as to be performed at a rate of less than 20° C. per hour, preferably at a rate of around 10° C. per hour.

The invention also relates to a glass melting furnace comprising a refractory product according to the invention, or a refractory product that has been manufactured or that may have been manufactured via a process according to the invention, in particular in a region intended to come into contact with molten glass. In a furnace according to the invention, the refractory product may advantageously form part of a tank for preparing glass by melting, especially by electric melting, in which it may come into contact with molten glass at a temperature above 1200° C.

Definitions

The mass contents of oxides are relative to the overall contents for each of the corresponding chemical elements, expressed in the form of the most stable oxide, according to the usual convention in the industry; suboxides and optionally nitrides, oxynitrides, carbides, oxycarbides, carbonitrides, or even the metal species of the abovementioned elements, are thus included.

A "molten material" is a liquid mass which, to conserve its form, must be contained in a container. It may contain a few solid particles, but in insufficient amount for them to be able to structure said mass.

The term "impurities" means the inevitable constituents, unintentionally and necessarily introduced with the starting materials or resulting from reactions with these constituents. The impurities are not necessary constituents, but merely tolerated. For example, the compounds forming part of the group of oxides, nitrides, oxynitrides, carbides, oxycarbides, carbonitrides and iron, titanium, vanadium and chromium metal species are impurities.

Unless otherwise mentioned, all the contents of oxides in the products described and claimed are mass percentages on the basis of the oxides.

The sign "+" separating two oxides conventionally means "and/or".

DETAILED DESCRIPTION OF THE INVENTION

In a fused-cast product according to the invention, the high content of zirconia $ZrO_2$ makes it possible to meet the requirements in terms of high corrosion resistance without coloration of the glass produced, and without generation of defects that are harmful to the quality of this glass.

In a product obtained by melting, $HfO_2$ is not chemically dissociable from $ZrO_2$. In the chemical composition of such a product, $ZrO_2+HfO_2$ denotes the total content of these two oxides. However, according to the present invention, $HfO_2$ is not deliberately added to the starting feedstock. $HfO_2$ therefore only denotes traces of hafnium oxide, this oxide always being naturally present in zirconia sources in contents generally less than 2%.

For the sake of clarity, the content of zirconia and of trace of hafnium oxide may be denoted without preference by $ZrO_2+HfO_2$ or by $ZrO_2$, or alternatively by "zirconia content".

The presence of silica $SiO_2$ is necessary and especially allows the formation of an intergranular vitreous phase that is capable of efficiently accommodating the variations in volume of zirconia during its reversible allotropic transformation, i.e. during its passage from the monoclinic phase to the tetragonal phase. The content of silica $SiO_2$ should, however, be limited to maintain very good corrosion resistance by limiting the content of vitreous phase to the benefit of the zirconia.

The presence of alumina $Al_2O_3$ promotes the formation of a stable vitreous phase and improves the flowability of the products in the mold. An excessive content leads to instability of the vitreous phase (formation of crystals), which has a negative impact on the feasibility, in particular in the presence of boron oxide.

The presence of boron oxide is optional. This element makes it possible to improve the feasibility of the products. In one embodiment, the mass content of $B_2O_3$ is thus greater than or equal to 0.3%, or even greater than or equal to 0.4%, or even greater than or equal to 0.5%.

The presence of boron oxide does, however, have an effect an adverse effect on the formation of zircon in the product. In another embodiment, a mass content of boron oxide $B_2O_3$ that is as low as possible is preferred.

The simultaneous presence of yttrium oxide $Y_2O_3$ and of the oxides CaO and/or SrO, in contents according to the invention, makes it possible, in combination with the other constituents, to obtain a refractory product that is particularly suitable for use in contact with molten glass. This refractory product in particular has good corrosion resistance and a resistance to thermal cycling that is high and substantially constant over time. These contents also make it possible to preserve good feasibility.

The alkaline oxides $Na_2O$ and $K_2O$ may migrate into the molten glass and do not make it possible to ensure a lasting effect. The mass content of $Na_2O+K_2O$ must therefore be limited.

According to the invention, $Fe_2O_3$, $TiO_2$ and $P_2O_5$ are known to be harmful and their content must preferably be limited to traces introduced as impurities with the starting materials.

The "other oxide species" are the species that are not listed above, namely species other than $ZrO_2$, $HfO_2$, $SiO_2$, $Al_2O_3$, $Na_2O$, $K_2O$, $B_2O_3$, CaO, SrO, $Y_2O_3$, $P_2O_5$, $Fe_2O_3$ and $TiO_2$. In one embodiment, the "other oxide species" are limited to species whose presence is not particularly desired and which are generally present as impurities in the starting materials.

The presence of the "other oxide species" does not substantially modify the results obtained, provided that their content remains less than 1.5%.

Conventionally, in a fused-cast product, the oxides represent more than 98.5%, more than 99%, or even substantially 100% of the mass of the product. This is likewise the case in a product according to the invention.

Any conventional process for manufacturing molten products based on zirconia that are intended for applications in glass melting furnaces may be used, provided that the composition of the starting feedstock makes it possible to obtain products that have a composition in accordance with that of a product according to the invention.

In particular, a product according to the invention may be conventionally manufactured according to steps a) to c) described above.

In step a), the starting materials are chosen so as to ensure the contents of oxides in the finished product. A person skilled in the art knows perfectly how to determine the composition of a starting feedstock as a function of the composition of the desired product.

In step b), the melting is preferably performed by means of the combined action of a fairly long electric arc, which produces no reduction, and of blending promoting the reoxidation of the products.

To minimize the formation of nodules of metallic appearance and to avoid the formation of slits or cracks in the final product, it is preferable to perform the melting under oxidative conditions.

Preferentially, use is made of the long-arc melting process described in French patent 1 208 577 and its additions 75893 and 82310.

This process consists in using an electric arc furnace whose arc spurts out between the feedstock and at least one electrode distanced from this feedstock and in regulating the length of the arc so that its reductive action is minimized, while at the same time maintaining an oxidative atmosphere above the molten bath and blending said bath, either by the action of the arc itself, or by sparging an oxidizing gas (for example air or oxygen) into the bath, or alternatively by adding to the bath substances that release oxygen such as peroxides or nitrates.

The melting may in particular take place at a temperature above 2300° C., preferably between 2400° C. and 2500° C.

A product of the invention thus manufactured is constituted of zirconia grains surrounded by a vitreous phase.

The zirconia may be monoclinic to more than 80%, more than 85%, more than 90%, more than 99% or substantially 100%, as a mass percentage.

The vitreous phase may comprise more than 50%, or even more than 70%, of silica, between 5% and 20% of $B_2O_3$ and between 1% and 20% of alumina, as mass percentages on the basis of the vitreous phase. The silica, $B_2O_3$ and alumina may represent more than 95%, more than 97%, or even substantially 100% of the mass of the vitreous phase.

EXAMPLES

The nonlimiting examples that follow are given for the purpose of illustrating the invention.

In these examples, the following starting materials were used:
 zirconia mainly containing, on average by mass, 98.5% of $ZrO_2+HfO_2$, 0.2% of $SiO_2$ and 0.02% of $Na_2O$,
 zircon sand containing 33% silica $SiO_2$,
 alumina of AC44 type sold by the company Pechiney and containing on average 99.4% of alumina $Al_2O_3$,
 boron oxide with a purity of greater than 99%,
 yttrium oxide with a purity of greater than 99%,
 calcium carbonate containing about 56% CaO,
 strontium carbonate containing about 70% SrO The starting materials were melted at a temperature of between 2000 and 2500° C., via the standard process of melting in a Héroult arc furnace, under oxidative conditions, and the molten material was then cast in molds to obtain blocks in 220 mm×450 mm×150 mm format.

The reference examples are the products ER-1195 and SCIMOS CZ, mentioned above.

For all the products obtained, crystallographic analysis reveals zirconia crystals surrounded by a vitreous phase typically comprising more than 70% silica.

Chemical analysis of the products obtained is given in Table 1. It is a mean overall chemical analysis, given as mass percentages on the basis of the oxides. The impurity content is about 0.3% as a mass percentage on the basis of the oxides; the remainder to 100% corresponds to the zirconia content.

The resistance to thermal cycling is determined by means of a test that consists in subjecting a sample (of dimensions 30 mm×30 mm×30 mm) to twenty cycles between 800° C. and 1250° C. (Test A) and between 500° C. and 1250° C. (Test B). At each cycle, the sample is maintained for 1 hour at 800° C. or at 500° C., respectively, and the temperature is then brought to 1250° C. over 1 hour and is maintained at this value for 1 hour.

The value Vv indicated in Table 1 corresponds to the increase in volume, given as a percentage, between the start and the end of the test. In this table, "ND" means "not determined".

Zirconia and the impurities constitute the remainder to 100%, the content of impurities being about 0.3%.

The results show that the tested products of the invention have very good resistance to thermal cycling, despite the low content, or even the absence, of $Na_2O$ and $K_2O$.

Examples 26 and 27 show that the resistance to thermal cycling is particularly improved when the ratio of the mass content of silica to the content of boron oxide $SiO_2/B_2O_3$ is greater than or equal to 8, in particular when the content of silica is less than 4.5%.

Without wishing to tie the invention to any theory, the inventors think that the composition of the products of the invention makes it possible to limit the formation of zircon. Thus, no formation takes place, around the zirconia crystals, of a crystalline phase having dilatometric behavior different from that of zirconia, in particular at about 1000-1150° C. The vitreous phase can then accommodate the volume deformations associated with thermal cycling.

Needless to say, the present invention is not limited to the embodiments described and represented, which are given as nonlimiting illustrative examples.

The invention claimed is:

1. Fused-cast refractory product comprising, as mass percentages on the basis of the oxides and for a total of 100% of the oxides:

TABLE 1

| Example | $SiO_2$ | $Al_2O_3$ | $B_2O_3$ | $Na_2O + K_2O$ | $Y_2O_3$ | $CaO + SrO$ | Test A (Vv) | Test B (Vv) | $Na_2O$ | $K_2O$ | CaO | SrO |
|---|---|---|---|---|---|---|---|---|---|---|---|---|
| ER1195 | 4.0 | 1.2 | 0.0 | 0.30 | 0.2 | 0.0 | 6 | 20 | 0.30 | 0.00 | 0.0 | 0.0 |
| CZ | 4.5 | 0.7 | 0.4 | 0.02 | 0.2 | 0.0 | 29 | 32 | 0.02 | 0.00 | 0.0 | 0.0 |
| 1 | 5.3 | 2.1 | 0.5 | 0.00 | 0.1 | 0.4 | 17 | ND | 0.00 | 0.00 | 0.4 | 0.0 |
| 2 | 4.4 | 1.2 | 0.5 | 0.00 | 0.1 | 2.5 | 48 | ND | 0.00 | 0.00 | 0.0 | 2.5 |
| 3 | 4.9 | 2.1 | 0.3 | 0.05 | 0.2 | 2.5 | 46 | ND | 0.05 | 0.00 | 2.5 | 0.0 |
| 4 | 5.2 | 2.1 | 0.3 | 0.02 | 0.0 | 2.1 | 36 | ND | 0.00 | 0.02 | 0.0 | 2.1 |
| 5 | 4.9 | 1.8 | 0.6 | 0.05 | 1.3 | 2.3 | 100 | ND | 0.05 | 0.00 | 2.3 | 0.0 |
| 6 | 5.2 | 2.0 | 0.4 | 0.05 | 1.4 | 2.2 | 48 | ND | 0.05 | 0.00 | 2.2 | 0.0 |
| 7 | 5.1 | 2.4 | 0.3 | 0.00 | 1.5 | 2.1 | ≤6 | ND | 0.00 | 0.00 | 0.0 | 2.1 |
| 8 | 5.0 | 2.2 | 0.3 | 0.00 | 1.6 | 2.0 | ≤6 | ND | 0.00 | 0.00 | 0.0 | 2.0 |
| 9 | 5.1 | 2.0 | 0.5 | 0.00 | 2.1 | 2.4 | ≤6 | ND | 0.00 | 0.00 | 2.4 | 0.0 |
| 10 | 5.1 | 2.2 | 0.2 | 0.01 | 2.1 | 1.9 | ≤6 | ≤9 | 0.00 | 0.01 | 0.0 | 1.9 |
| 11 | 4.3 | 2.1 | 0.1 | 0.00 | 2.1 | 2.3 | ≤6 | ≤9 | 0.00 | 0.00 | 2.1 | 0.2 |
| 12 | 4.9 | 2.1 | 0.2 | 0.12 | 2.2 | 2.2 | ≤6 | ≤9 | 0.07 | 0.05 | 2.1 | 0.1 |
| 13 | 5.2 | 2.2 | 0.2 | 0.10 | 2.2 | 1.9 | ≤6 | ≤9 | 0.07 | 0.03 | 0.0 | 1.9 |
| 14 | 2.8 | 2.5 | 0.1 | 0.00 | 2.2 | 2.6 | ≤6 | ≤9 | 0.00 | 0.00 | 2.3 | 0.3 |
| 15 | 4.6 | 2.1 | 0.1 | 0.01 | 2.2 | 2.2 | ≤6 | ≤9 | 0.00 | 0.01 | 2.0 | 0.2 |
| 16 | 5.1 | 2.0 | 0.6 | 0.05 | 2.3 | 2.3 | ≤6 | ≤9 | 0.05 | 0.00 | 2.3 | 0.0 |
| 17 | 5.1 | 2.3 | 0.5 | 0.00 | 2.5 | 2.3 | ≤6 | ≤9 | 0.00 | 0.00 | 1.3 | 1.0 |
| 18 | 5.2 | 2.3 | 0.5 | 0.00 | 2.6 | 2.3 | ≤6 | ND | 0.00 | 0.00 | 1.6 | 0.8 |
| 19 | 5.1 | 2.2 | 0.1 | 0.06 | 2.6 | 2.3 | ≤6 | ≤9 | 0.05 | 0.01 | 1.7 | 0.6 |
| 20 | 5.3 | 2.2 | 0.1 | 0.13 | 2.6 | 2.4 | ≤6 | ≤9 | 0.09 | 0.04 | 1.9 | 0.5 |
| 21 | 2.8 | 1.4 | 0.1 | 0.06 | 2.2 | 1.4 | ND | ≤9 | 0.05 | 0.01 | 1.4 | 0.0 |
| 22 | 3.2 | 1.7 | 0.2 | 0.00 | 2.0 | 1.4 | ND | ≤9 | 0.00 | 0.00 | 0.7 | 0.7 |
| 23 | 3.6 | 1.6 | 0.1 | 0.07 | 2.4 | 1.2 | ND | ≤9 | 0.06 | 0.01 | 0.3 | 0.9 |
| 24 | 5.2 | 2.1 | 0.1 | 0.06 | 2.7 | 2.2 | ND | ≤9 | 0.06 | 0.00 | 1.8 | 0.4 |
| 25 | 5.5 | 2.6 | 0.1 | 0.11 | 2.2 | 1.6 | ND | ≤9 | 0.09 | 0.02 | 1.6 | 0.0 |
| 26 | 4.2 | 2.0 | 0.8 | 0.02 | 1.9 | 2.8 | ND | 11 | 0.00 | 0.02 | 2.5 | 0.3 |
| 27 | 3.6 | 1.1 | 0.7 | 0.00 | 2.1 | 1.7 | ND | 16 | 0.00 | 0.00 | 0.9 | 0.8 |
| 28 | 1.5 | 1.0 | 0.0 | 0.06 | 1.6 | 1.6 | ND | ≤9 | 0.05 | 0.01 | 1.5 | 0.1 |
| 29 | 2.6 | 1.3 | 0.1 | 0.06 | 2.0 | 1.5 | ND | ≤9 | 0.05 | 0.01 | 1.5 | 0.0 |

Comparison of Examples 4 and 6 shows that, in the presence of a content of alkaline oxides of less than 0.15%, an increase in the content of $Y_2O_3$ may be detrimental, the result in test A going from 36 to 48 when the content of $Y_2O_3$ goes from 0 to 1.4%. The inventors have, to their merit, discovered that a positive effect was possible beyond a content of 1.5%, especially provided that the CaO+SrO content is between 1.2% and 3.0%, as illustrated in particular by comparison of Examples 6 and 8.

$ZrO_2+HfO_2$: remainder to 100%, with $HfO_2$≤5%;
$SiO_2$: 1.5% to 7.5%;
$Al_2O_3$: 1.0% to 3.0%;
$CaO + SrO$: 1.2% to 3.0%;
$Y_2O_3$: 1.5% to 3.0%;
$Na_2O$ [+] and $K_2O$: <0.15%;
$B_2O_3$: <1.0%;
$P_2O_5$: <0.15%;
$Fe_2O_3+TiO_2$: <0.55%;

oxide species other than $ZrO_2$, $HfO_2$, $SiO_2$, $Al_2O_3$, $Na_2O$, $K_2O$, $B_2O_3$, CaO, SrO, $Y_2O_3$, $P_2O_5$, $Fe_2O_3$ and $TiO_2$: <1.5%.

2. Product according to claim 1, in which the mass content of $Y_2O_3$ is less than or equal to 2.5%.

3. Product according to claim 1, in which the mass content of $Y_2O_3$ is greater than or equal to 1.7%.

4. Product according to claim 1, in which the mass content of CaO+SrO is less than or equal to 2.5%.

5. Product according to claim 1, in which the mass content of CaO+SrO is greater than or equal to 1.3%.

6. Product according to claim 1, in which the mass content of CaO+SrO is greater than or equal to 1.8%.

7. Product according to claim 1, in which the mass content of silica $SiO_2$ is greater than or equal to 2.5%.

8. Product according to claim 1, in which the mass content of silica $SiO_2$ is less than or equal to 7.0%.

9. Product according to claim 1, in which the mass content of silica $SiO_2$ is less than or equal to 6.0%.

10. Product according to claim 1, in which the mass content of $Al_2O_3$ is less than or equal to 2.5%.

11. Product according claim in which the mass content of $Al_2O_3$ is less than or equal to 2.3%.

12. Product according to claim 1, in which the mass content of $Al_2O_3$ is greater than or equal to 1.5%.

13. Product according to claim 1, in which the mass content of $B_2O_3$ is less than or equal to 0.5%.

14. Product according to claim 1, in which:
the mass content of $Na_2O$ +$K_2O$ is less than or equal to 0.10%, and
the mass content of iron oxide and/or titanium oxide, $Fe_2O_3$+$TiO_2$, is less than 0.4%, and
the mass content of $P_2O_5$ is less than or equal to 0.05%, and
the total mass content of the oxide species other than $ZrO_2$, $HfO_2$, $SiO_2$, $Al_2O_3$, $Na_2O$, $K_2O$, $B_2O_3$, CaO, SrO, $Y_2O_3$, $P_2O_5$, $Fe_2O_3$ and $TiO_2$ is less than 1.0%.

15. Product according to claim 1, in which the ratio of the mass content of silica to the content of boron oxide $SiO_2$ /$B_2O_3$ is greater than or equal to 8.

* * * * *

UNITED STATES PATENT AND TRADEMARK OFFICE
CERTIFICATE OF CORRECTION

Page 1 of 1

PATENT NO. : 10,239,793 B2
APPLICATION NO. : 15/552015
DATED : March 26, 2019
INVENTOR(S) : Isabelle Cabodi et al.

It is certified that error appears in the above-identified patent and that said Letters Patent is hereby corrected as shown below:

On the Title Page

In item (73) titled Assignee, please delete:
"SAINT-GOBAIN CENTRE DE RECHERCHES ET D'ETUDES EUROPEAN"
And replace with:
SAINT-GOBAIN CENTRE DE RECHERCHES ET D'ETUDES EUROPEEN In the Claims Column 8, Line 64:
In Claim 1, Please delete "[+]"

Signed and Sealed this
Twenty-fifth Day of June, 2019

Andrei Iancu
*Director of the United States Patent and Trademark Office*